Jan. 21, 1936.  H. D. STEVENS  2,028,695
METHOD AND APPARATUS FOR SHAPING TIRES
AND MOUNTING EXPANSIBLE CORES THEREIN
Filed July 31, 1934   5 Sheets-Sheet 4

INVENTOR
HORACE D. STEVENS
BY
Barrow
ATTORNEYS

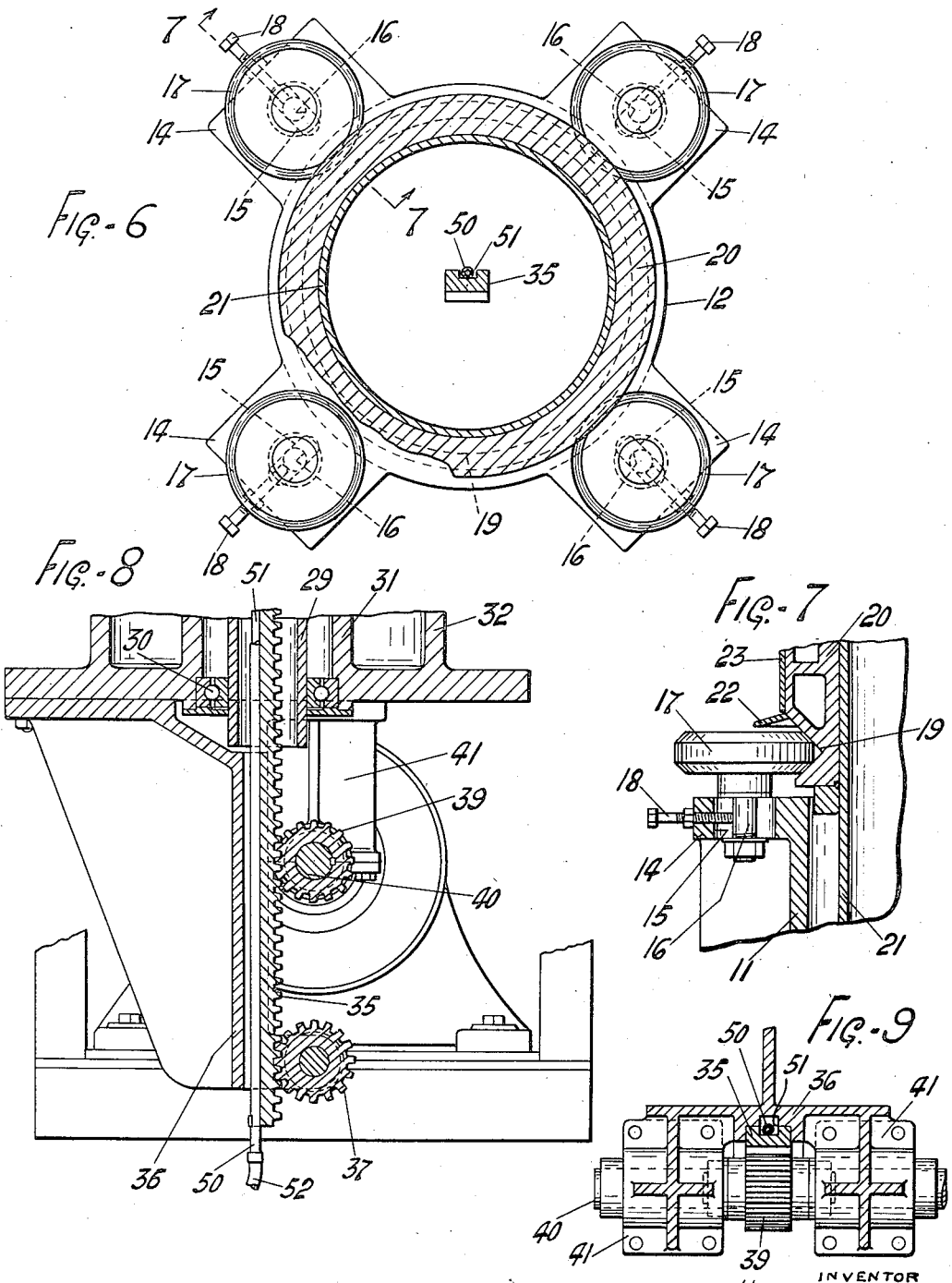

Patented Jan. 21, 1936

2,028,695

UNITED STATES PATENT OFFICE 2,028,695

METHOD AND APPARATUS FOR SHAPING TIRES AND MOUNTING EXPANSIBLE CORES THEREIN

Horace D. Stevens, Akron, Ohio, assignor to The Firestone Tire & Rubber Company, Akron, Ohio, a corporation of Ohio Application July 31, 1934, Serial No. 737,748

18 Claims. (Cl. 18—2)

This invention relates to methods of and apparatus for shaping tires and mounting expansible cores therein, and more especially it relates to procedure and machines for shaping flat built tire bands to ultimate tire form by the use of centrifugal force and for inserting expansible cores, commonly called air bags, into the tires concurrently with the shaping thereof.

In some of its aspects the invention is an improvement upon the inventions of Maas, Patent No. 1,757,934, issued May 6, 1930, and Nichols, Patent No. 1,956,131, issued April 24, 1934.

The chief objects of the invention are to provide an improved method of shaping tire bands by centrifugal force and mounting expansible cores therein; and to provide apparatus for carrying out the aforesaid method. Another object is to provide for inserting the expansible core into the tire during the shaping thereof. Still another object is to provide for subjecting the expansible core to centrifugal force to facilitate the mounting and seating of the core in the tire. Other objects will be manifest as the specification proceeds.

Of the accompanying drawings:

Figure 6 is a section, on a larger scale, on the line 6—6 of Figure 1;

Figure 7 is a section on the line 7—7 of Figure 6;

Figure 8 is a section, on a larger scale, on the line 8—8 of Figure 1; and

Figure 9 is a section, on a larger scale, on the line 9—9 of Figure 1.

Figure 1:
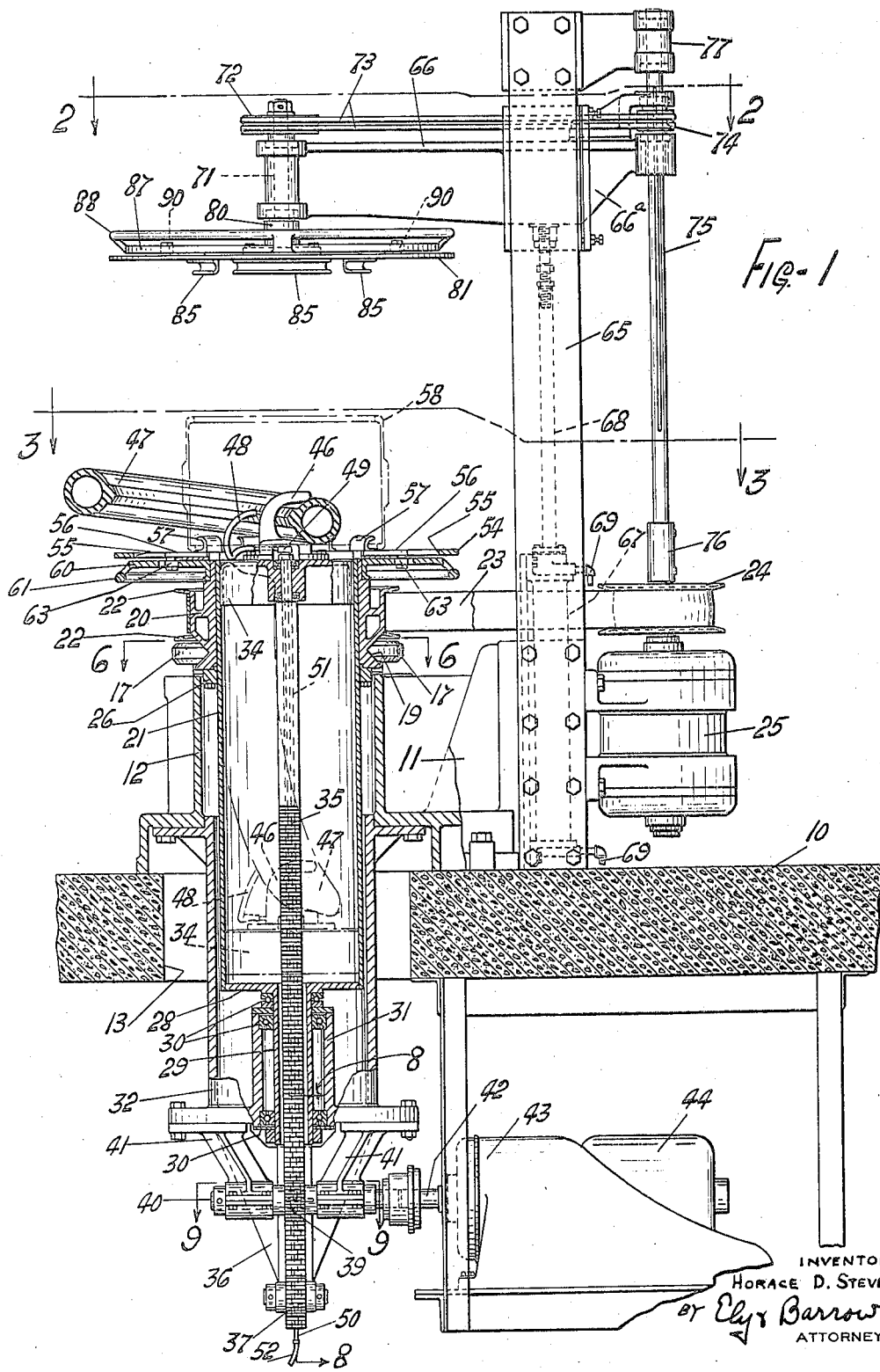
Figure 1 is a side elevation, partly in vertical section, of apparatus embodying and adapted to carry out the invention, in its preferred form, in inoperative position.
Figure 2:
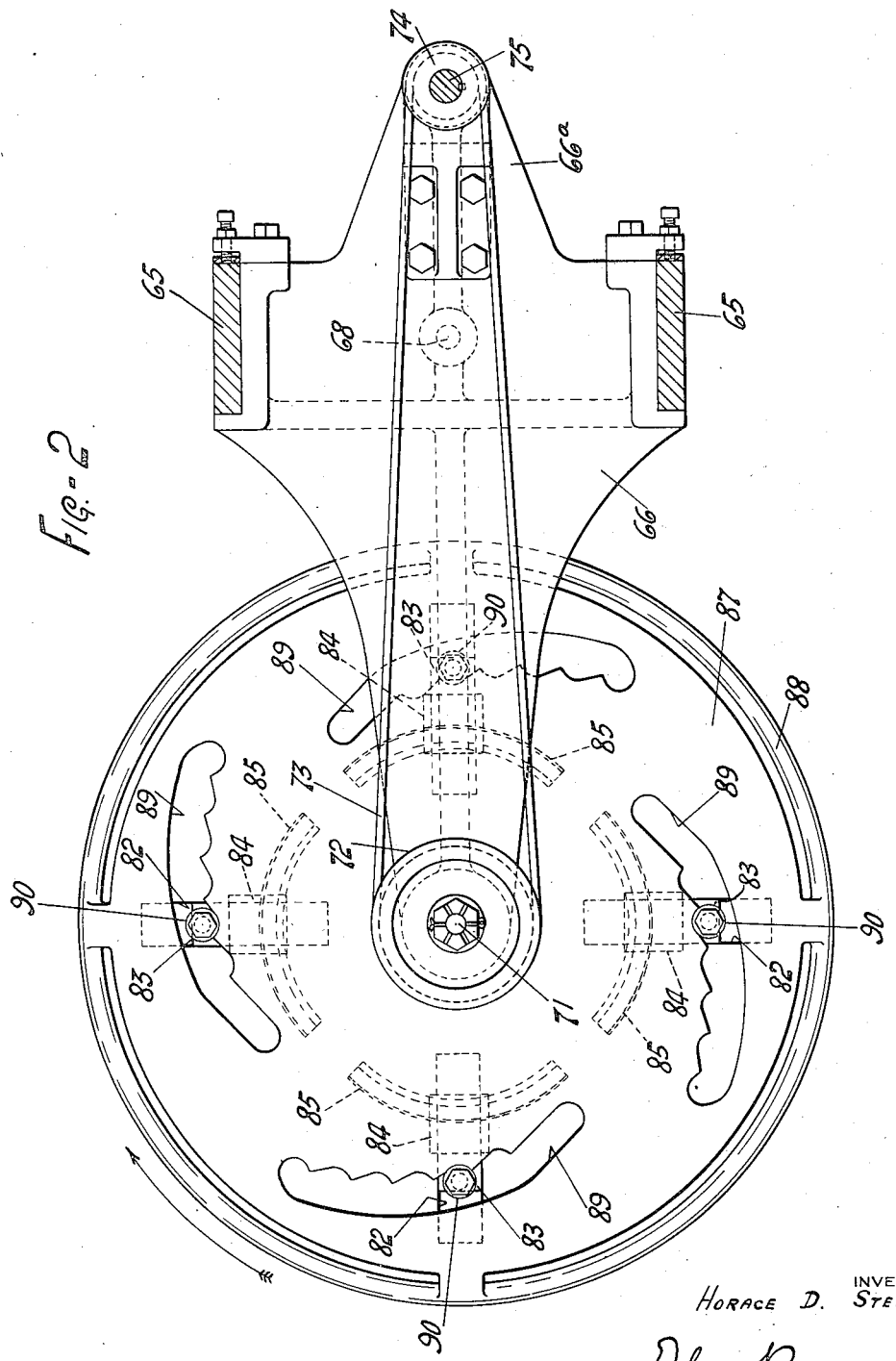
Figure 2 is a section, on a larger scale, on the line 2—2 of Figure 1, showing the upper cam plate in inoperative position.
Figure 3:
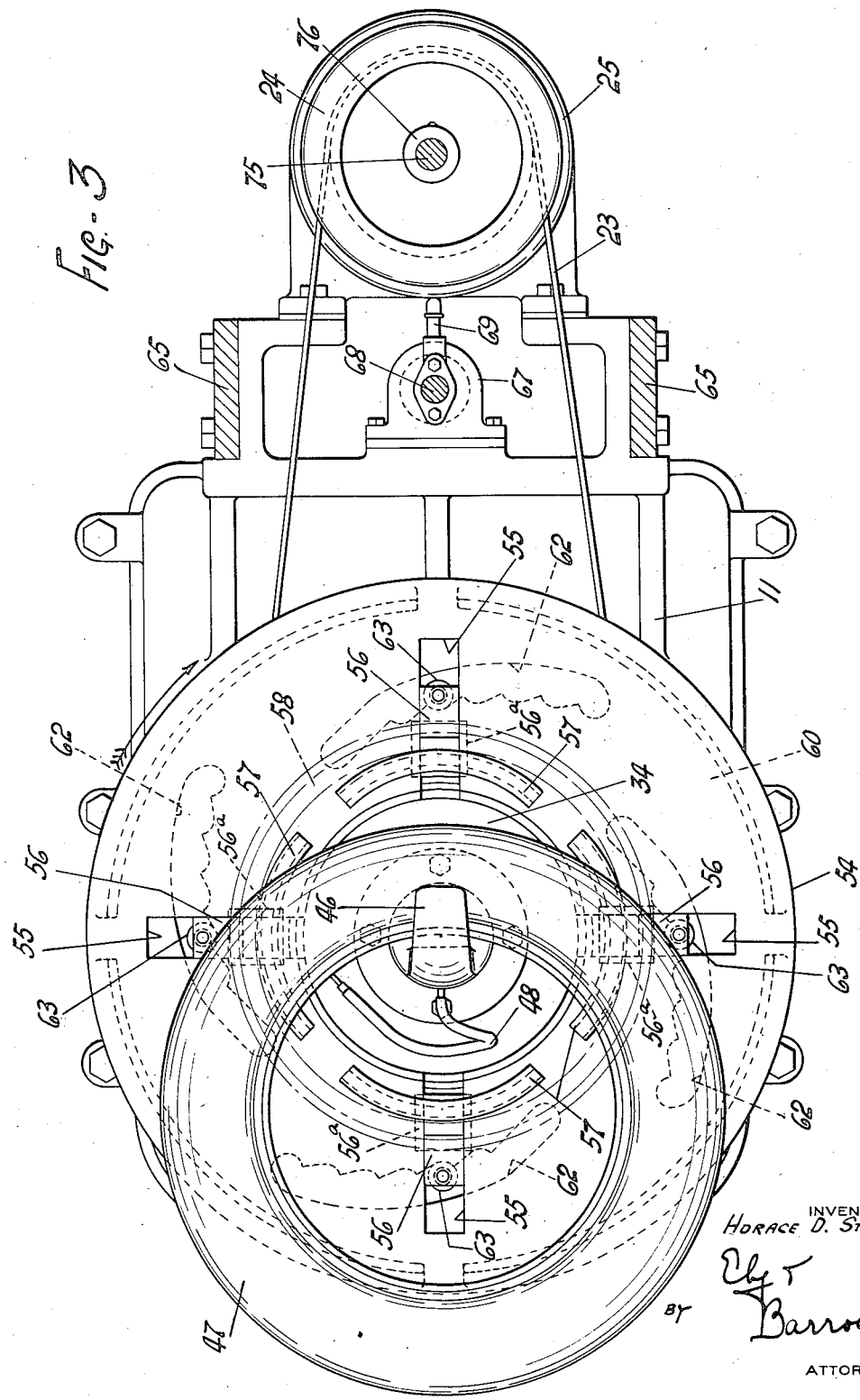
Figure 3 is a section on a larger scale on the line 3—3 of Figure 1.
Figure 4:
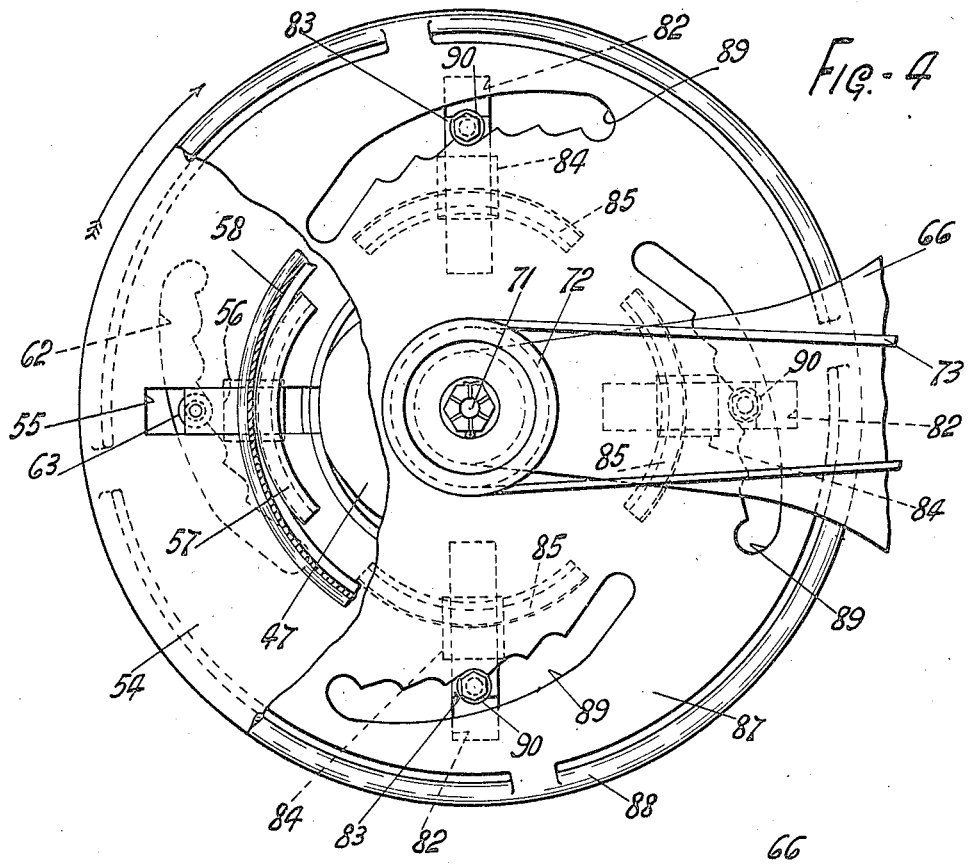
Figure 4 is a view of a portion of the apparatus shown in Figure 2, showing the cam plate in the relative angular position to which it is turned at the beginning of operation.

Referring now to Figure 1 of the drawings, there is shown a suitable flooring 10 upon which is positioned a base casting 11, the latter being formed at its front with an upstanding, tubular, well or supporting structure 12 that is positioned over an opening 13 of equal or larger size in the floor 10. At its top the tubular structure 12 is formed with a plurality (herein shown as four) of radially extending brackets 14, 14, Figures 6 and 7, each of which is formed with a radially disposed slot 15. Mounted in the slots 15 are respective spindles 16 upon which respective disc-like bearings 17 are journaled, and respective adjusting screws 18 are threaded through brackets 14 radially into slots 15 and into engagement with spindles 16 for accurately positioning the bearings 17 with relation to the axis of supporting structure 12. The edges of the bearings 17 are substantially beveled as shown so that said bearings may engage in a circumferential V-shaped groove 19 formed in an annular collar 20 that is mounted upon a hollow cylinder 21 adjacent the upper end thereof, said cylinder 21 extending downwardly through tubular structure 12 to a point below floor 10. Above groove 19, collar 20 is provided with spaced circumferential flanges 22, 22 for laterally guiding an endless transmission belt 23 that is trained about collar 20 and about a pulley 24 on the vertically disposed shaft of a motor 25. The latter is mounted upon the base plate 11 at the rear thereof, the arrangement being such that the motor 25 drives the hollow cylinder 21 about its own axis in the direction indicated by the arrow in Figure 3. An annular collar 26 secured to the lower margin of collar 20 extends into tubular structure 12 to maintain cylinder 21 accurately in alignment therewith.

The upper end of cylinder 21 is open, but its lower end is provided with a bottom plate 28 that is axially apertured and provided with a downwardly extending axial sleeve 29. The latter is journaled in suitable bearings 30, 30 carried by a tubular bearing housing 31 that is formed at the lower end of a tubular structure 32 that is secured at its upper end to the base plate 11. The structure 32 extends downwardly from the base plate 11, through floor opening 13, and constitutes in effect an extension of tubular structure 12 with which it is axially aligned.

Fitted within the cylinder 21 is a vertically reciprocable piston or ram 34 that is axially swivelled upon the upper end of an elongate rack 35, the latter extending downwardly therefrom and through the sleeve 29. Below the sleeve 29 the rack 35 moves in a vertical slideway formed in one face of a guide-bracket 36 that extends downwardly from the lower end of tubular structure 32, said bracket 36 also carrying an idler pinion 37 that is meshed with rack 35 and serves to retain the latter securely in its slideway. Below sleeve 29 rack 35 also meshes with a driving pinion 39 that is keyed to a shaft 40 that is journaled in a pair of bearing brackets 41, 41 secured to the lower end of tubular structure 32 and bracket 36. Shaft 40 is coupled to the shaft 42 of a reduction gear device 43 that is driven by a reversible motor 44, the arrangement being such that the motor may be utilized to raise and lower the ram 34.

Mounted upon the top of ram 34 is a hook 46 that is adapted, when the ram is in its uppermost position, as shown in full lines in Figure 1, to engage with an expansible core 47, and upon lowering of the ram, to draw said core into the cylinder 21 by folding the core into elongate elliptical form, as shown in broken lines in Figure 1. Such folding of the core 47 is facilitated by the withdrawal of air from the interior thereof, and to this end a flexible pipe 48 is provided, one end of said pipe being provided with a suitable coupling for quick and easy connection to the inflating stem of the core, and the other end of said pipe being connected to a delivery head 49 that is swiveled upon the upper end of a rigid pipe 50. The pipe 50 is mounted in a suitable groove 51 formed in and extending longitudinally of the rack 35, the lower end of pipe 50 extending below said rack and being connected to a flexible pipe 52 extending to a suitable source of sub-atmospheric pressure (not shown).

Welded at its inner periphery to the top of cylinder 21 is a ring-shaped plate 54 constituting the lower platen of the machine. As is most clearly shown in Figure 3, the platen 54 is formed with four equally spaced radial slots 55, 55 in which are mounted respective slides 56, and mounted upon the inner end of each of the latter is an arcuate tire bead-engaging member or clamp 57. Retaining plates 56a are secured to the under sides of slides 56 and extend laterally beneath platen 54 for retaining the slides in slots 55. The arrangement is such that the arcuate clamps 57 are concentric and define a complete circle when the slides 56 are at the innermost ends of slots 55, and in this position the overall diameter of the clamp-circle is less than the inside diameter of the smallest tire band that may be shaped by the apparatus.

Figure 5:
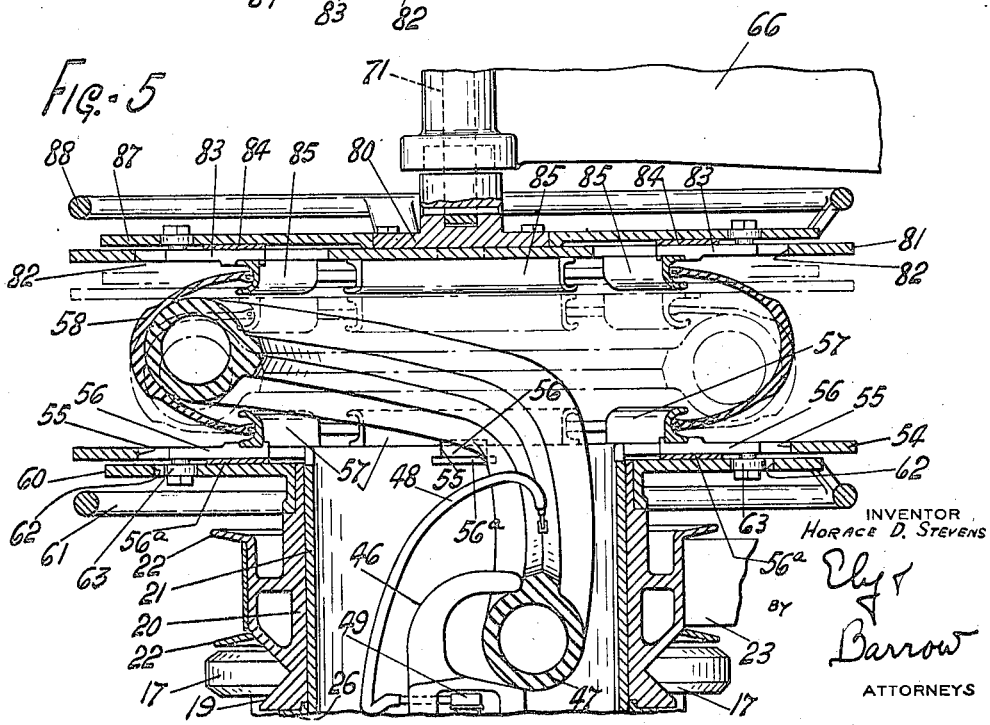
Figure 5 is a fragmentary detail sectional view, on a larger scale, of some of the apparatus shown in Figure 1, and the work therein, showing how the expansible core is inserted in the tire band during the shaping of the latter.

A drum-built tire band, designated 58, is shown in association with the apparatus in Figures 1 and 5 of the drawings. The clamp members 57 are transversely arcuate or hook-shaped as shown, with their concave surface outermost for more effective engagement with a bead portion of a tire band during the shaping of the latter, as is most clearly shown in Figure 5. The slides 56 rest upon a cam plate 60 that is positioned immediately below platen 54 and is journaled upon an extension of collar 20. Said cam plate 60 comprises a concentric handwheel 61 secured thereto for manually turning the cam plate angularly with relation to platen 54. Cam plate 60 is formed with four, symmetrically arranged cam slots 62, 62 that are of general arcuate shape, one end of each slot being nearer the axis of the cam plate than the other end of the slot. the inner margins of the slots 62 are serrated as shown, for engagement with respective cam rollers 63 journaled on the bottoms of respective slides 56. The arrangement is such that angular movement of cam plate 60 relatively of platen 54 will cause radial movement of bead clamp members 57, whereby the latter engage or disengage tire band 58, the serrated contour of slots 62 assuring that the members 57 normally will remain in adjusted position. When the cylinder 21 is driven by motor 25 in the direction indicated by the arrow in Figure 3, it is likely that centrifugal force will move the slides 56 radially outwardly so that their cam rollers 63 are disengaged from the serrated edges of slots 62. For this reason the leading ends of slots 62 are disposed farther from the axis of the cam plate 60 than the trailing ends thereof, to the end that after a tire band has been shaped by the centrifugal force set up by rotation of platen 54, relatively quick stopping of the platen will cause the momentum of cam plate 60 to effect such relative movement of the cam plate and platen as automatically will move the slides 56 and bead-clamping members 57 to their innermost positions so that the work may be removed immediately upon stopping of the rotation of the machine.

Rising from the base casting 11, rearwardly of cylinder 21 and its associated parts, are two parallel, spaced posts 65, 65 that constitute lateral guides for an overhanging arm 66, the latter being arranged for vertical movement in said guides. For raising and lowering arm 66, there is provided a double-acting fluid pressure operated cylinder 67, that is mounted upon a vertical axis on base plate 11, between the lower ends of guide posts 65. The piston rod 68 of cylinder 67 extends upwardly and is connected at its outer end to arm 66. The cylinder 67 is provided with the usual inlet-and-outlet pipes 69, 69 extending to a suitable source of pressure fluid (not shown).

The forward end of arm 66 overhangs cylinder 21, and carries a vertically disposed shaft 71 that is co-axial with said cylinder. Mounted upon the upper end of shaft 71 is a dual-grooved pulley 72 that is connected by a pair of transmission belts 73, 73 to a dual-grooved driving pulley 74. The latter is keyed for movement longitudinally of a vertical drive-shaft 75 that is coupled at 76 to the shaft of motor 25. The shaft 75 is journaled in a rearward extension 66a of arm 66 and in a bearing bracket 77 mounted at the top of guide posts 65 and extending rearwardly therefrom. The ratio of pulleys 72, 74 is the same as the ratio of collar 20 to pulley 24, the arrangement being such that motor 25 drives cylinder 21 and shaft 71 at the same angular speed.

Mounted upon the lower end of shaft 71 is a flanged collar 80, to the bottom of which is secured a circular plate 81 constituting the upper platen of the machine. The upper platen 81 is similar to lower platen 54, and comprises radial slots 82, 82 in which are mounted respective slides 83 that are provided with retaining plates 84 and carry arcuate bead-engaging clamps 85 at their inner ends, said clamps being identical with the clamps 57 previously described with relation to the lower platen. Mounted above platen 81 and resting thereon is a cam plate 87 that is formed with an axial aperture through which the flange of collar 80 extends. The arrangement is such that cam plate 87 may be moved angularly relatively of platen 81, the flanged collar 80 retaining the cam plate in proper axial position at all times. The cam plate is formed with an integral handwheel 88 by means of which it may be manually rotated as described. In all other respects upper cam plate 87 is similar to lower cam plate 60, and it comprises arcuate cam slots 89, 89 that are serrated on their inner margins for engagement with respective cam rollers 90 extending upwardly from the respective slides 83.

The method of practising the invention with the apparatus described is as follows: assuming the various parts of the apparatus to be in the positions shown in Figure 1, with both motors stationary, the operator places an expansible core 47 in engagement with hook 46 as shown, and connects flexible pipe 49 to the inflation stem of the core. He then starts motor 44 running to draw ram 34 and hook 46 downwardly into cylinder 21, and concurrently operates the valve (not shown) which causes suction to be applied to the interior of core 47 to collapse the same. As the hook 46 moves downwardly it drags the core 47 with it, and folds it into elongate form, the operator meanwhile pulling backwardly on the trailing end of the core so that it moves into cylinder 21 in determinate position. When the ram 34 reaches its lowermost position, as shown in broken lines in Figure 1, the drive of motor 44 is stopped.

The operator then places a tire band 58 upon the lower platen 54 about clamp members 57, and then manually rotates cam plate 60 to move clamps 57 radially outwardly into engagement with the inner periphery of the tire band, at the bead region thereof. Next the fluid pressure cylinder 67 is operated to lower the arm 66 until upper platen 81 rests upon the upper margin of the tire, whereupon the operator rotates cam plate 87 to cause clamp members 85 to move radially outwardly into engagement with the upper bead region of the tire. Motor 25 is then set in motion to rotate upper and lower platens 81, 54 and cylinder 21, and cylinder 67 operated to continue the downward movement of the upper platen, with the result that centrifugal force is set up in the rotating parts and work. This causes the central portion of the latter, between its inextensible marginal beads, to bulge and move outwardly toward tire shape. Centrifugal force also may cause the bead clamps 57 and 85 to move outwardly so as more forcibly to grip the tire, and they may even force it slightly out of round, without detrimental effect.

When the upper platen reaches substantially the full line position shown in Figure 5, downward movement of the platen is halted, and as the tire and cylinder 21 continue to rotate, motor 44 is started rotating in the direction to raise the ram 34 so as to force the expansible core 47 from the cylinder. Concurrently the suction in the core is released and air under pressure is admitted to the core. Upon emerging from the cylinder 21, the leading end of the expansible core moves laterally as shown, because of centrifugal force and because of the manner in which it was held while being drawn into the cylinder, with the result that the core moves easily into engagement with the bulged, central portion of the tire.

Air pressure passing into the core as it emerges from the cylinder 21 causes it to change from its folded, elongated form to normal circular form, so that as hook 46 reaches its uppermost position, shown in Figure 1, the trailing end of the core springs away from said hook and seats itself in the tire, centrifugal force set up by rotation of the work facilitating this operation. Motor 44 stops when the ram 34 reaches the top of cylinder 21, and concurrently the flow of air to the expansible core ceases. The upper platen 81 may then be lowered to the position shown in broken lines in Figure 5 to complete the tire shaping operation. Motor 25 is then stopped, and cam plates 60 and 87 are manually rotated in the direction to withdraw bead clamps 57 and 85 from engagement with the tire, after which the cylinder 67 is operated to lift the arm 66 to its elevated, inoperative position. The shaped tire with core therein may then be removed from the apparatus. This completes a cycle of operation which may be repeated as desired.

It will be seen that the apparatus is capable of shaping and mounting cores in tires of a large number of different sizes, and achieves the other advantages set out in the foregoing statement of objects.

Modification may be resorted to without departing from the spirit of the invention or the scope of the appended claims, which are not limited to the specific construction shown or exact procedure described.

What is claimed is:

1. The method of shaping a tire band and inserting an expansible core therein which comprises rotating the tire band to apply centrifugal force uniformly radially thereto until it assumes arcuate cross-sectional form, and moving an expansible core into the tire while it is rotating.

2. The method of shaping a tire band and inserting an expansible core therein which comprises rotating the tire band to apply radially directed centrifugal force uniformly thereto so that it assumes arcuate cross-sectional form, deforming an annular expansible core into elongated form, and inserting said elongated core end-first into the tire as the latter rotates.

3. The method of shaping a tire band and inserting an expansible core therein which comprises rotating a tire band about its own axis to apply radially directed centrifugal force uniformly thereto so that it assumes arcuate cross-sectional shape, deforming an annular expansible core into elongated form, feeding said elongated core end-first into the tire from a point exteriorly thereof, and subjecting said core to centrifugal force as it passes into the tire to facilitate its seating therein.

4. The method of shaping a tire band and inserting an expansible core therein which comprises so confining an expansible core as to fold it to elongate form, positioning the folded form exteriorly of a tire band substantially in alignment with the axis of the latter, rotating the tire band and confined core about the axis of the tire whereby the latter is subjected to radially directed centrifugal force that causes it to assume arcuate cross-sectional shape, and then moving the elongate core end-first out of confinement and into the tire, said core being subjected to centrifugal force as it leaves its place of confinement whereby seating of the core in the tire is facilitated.

5. The method of mounting an expansible core in a tire which comprises doubling the core into elongate form, positioning the folded core substantially in alignment with the axis of the tire, exteriorly thereof, rotating the tire and folded core at the same speed about the axis of the tire, and feeding the core end-first into the tire while core and tire are so rotating.

6. The method of shaping a tire band and inserting an expansible core therein which comprises spinning a tire band upon its own axis and moving the bead portions of the tire toward each other at determinate speed whereby centrifugal force applied radially to the tire band shapes it to arcuate cross-sectional form, and inserting an expansible core in the tire, through the axial opening therein while the tire is spinning.

7. In apparatus for shaping tire bands and inserting expansible cores therein, the combination of means for rotating a tire band on its own axis to apply centrifugal force radially thereto until it assumes arcuate cross-sectional shape, and means for moving an expansible core into the tire and seating it therein while the tire is rotating.

8. In apparatus for shaping tire bands and inserting expansible cores therein, the combination of means for rotating a tire band on its own axis to apply centrifugal force radially to the tire to shape it to arcuate cross-sectional form, means for deforming an annular expansible core to elongate shape, and means for inserting the elongated core end-first into the tire as the latter rotates.

9. In apparatus for shaping a tire band and inserting an expansible core therein, the combination of means for rotating a tire band about its own axis to set up radially directed centrifugal force to shape the tire to arcuate cross-sectional form, means for deforming an annular expansible core to elongate form, means for feeding the elongated core end-first into the tire from a point exteriorly thereof, and means for subjecting the core to centrifugal force as it enters the tire to facilitate its proper seating therein.

10. In apparatus for shaping a tire band and inserting an expansible core therein, the combination of means for rotating a tire band on its own axis to subject it to radially directed centrifugal force whereby it is shaped to arcuate cross-sectional form, means for confining an annular expansible core in a manner to fold the latter to elongate form, said core-confining means being disposed exteriorly of the tire in axial alignment therewith, means for rotating said core-confining means at the same speed and in the same direction as the tire, and means for moving the core out of its confining means into the tire while the latter and the confining means are rotating.

11. In apparatus for mounting an expansible core in a tire, the combination of a container, means for mounting an annular expansible core therein in such a manner as to fold the core into elongate form, means for positioning a tire in axial alignment with said container, means for rotating the tire and container at the same speed in the same direction, and means for ejecting the core from the container into the tire as said container and tire are rotating.

12. In apparatus of the character described, the combination of means for rotating a tire band on its own axis, means for moving the bead portions of the tire band toward each other at determinate speed as the tire is so rotated, whereby centrifugal force applied radially to the tire band shapes it to arcuate cross-sectional form, and means for inserting an expansible core in the tire, through the axial opening therein, as the tire is rotating.

13. In apparatus for shaping a tire band to tire form, the combination of means for engaging the respective bead portions of a tire band, means for concurrently rotating said bead-engaging means about the axis of the tire to set up radially directed centrifugal force in the latter, and means for inserting a core within said tire band as it is being shaped, said bead portion engaging means being constructed and arranged to hold the beads concentric while being rotated and during insertion of the core.

14. In apparatus for shaping a tire band to tire form, the combination of means for engaging the respective bead portions of a tire band, means for rotating said bead-engaging means in unison about the axis of the tire, means for moving said bead-engaging means toward each other as they rotate, and means for holding said beads apart when the shaping of the tire has been completed, whereby a core may be inserted into the tire between the beads while the tire is rotating.

15. In apparatus for shaping a tire band to tire form, the combination of a pair of axially aligned platens, means for driving the platens at the same angular speed, means for moving the platens axially relatively of each other, means for inserting a core within the tire band while the latter is being rotated, and means on the platens for gripping the bead portions of said tire band positioned between the platens and for holding the bead portions concentric with the axis of rotation while the tire band is being rotated and during the insertion of the core.

16. In apparatus for shaping a tire band to tire form, the combination of a pair of opposed, axially aligned platens, means for rotating the platens in unison at the same speed, means for moving the platens toward and away from each other, and means carried by the platens for frictionally gripping the respective marginal portions of a tire band positioned therebetween, said means being so constructed and arranged as more firmly to grip the tire when the platens are rotating by reason of centrifugal force.

17. In apparatus for shaping a tire band and inserting an expansible core therein, the combination of opposed, axially aligned platens, means for rotating the platens in unison, means for moving the platens axially relatively of each other, means on the platens for clamping the bead portions of a tire band positioned between the platens, a hollow cylinder secured to one of the platens and opening thereonto, said cylinder being adapted to receive an expansible core in folded condition, and means for ejecting the core therefrom while the platens and cylinder are rotating.

18. In apparatus for shaping a tire band to tire form, the combination of a pair of opposed, axially aligned platens, means for rotating the platens in unison at the same speed, means for moving the platens toward and away from each other, a series of gripper members on each platen, and cam means for moving said grippers radially so as frictionally to engage the bead portions of a tire band positioned between the platens, said cam means being so constructed and arranged as to permit increased frictional engagement of the grippers due to centrifugal force when the platens are rotating.

HORACE D. STEVENS.